(12) United States Patent
Maillard et al.

(10) Patent No.: US 11,670,105 B2
(45) Date of Patent: Jun. 6, 2023

(54) BIOMETRIC TERMINAL, IN PARTICULAR FOR ACCESS CONTROL

(71) Applicant: Idemia Identity & Security France, Courbevoie (FR)

(72) Inventors: Sylvain Emile Henri Maillard, Courbevoie (FR); Jean-Rémi Sandraz, Courbevoie (FR); Denis Dumont, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 10 days.

(21) Appl. No.: 17/443,364

(22) Filed: Jul. 26, 2021

(65) Prior Publication Data

US 2022/0036034 A1 Feb. 3, 2022

(30) Foreign Application Priority Data

Jul. 30, 2020 (FR) ...................... 2008089

(51) Int. Cl.
*G06V 40/13* (2022.01)
*G02B 30/56* (2020.01)
(Continued)

(52) U.S. Cl.
CPC ........ *G06V 40/1318* (2022.01); *G01J 5/0806* (2013.01); *G02B 30/56* (2020.01);
(Continued)

(58) Field of Classification Search
CPC .. G06V 40/1318; G06V 10/141; G06V 40/67; G06V 40/1312; G06V 40/1324; G01J 5/0806; G01J 2005/0077; G02B 30/56; G06K 7/10366; H04N 5/2256; G06F 21/32
See application file for complete search history.

(56) References Cited

U.S. PATENT DOCUMENTS

2009/0046331 A1 2/2009 Dufresne de Virel
2012/0076369 A1* 3/2012 Abramovich ...... G06V 40/1312
382/126
(Continued)

FOREIGN PATENT DOCUMENTS

JP 2011013710 A 1/2011
WO 2019102686 A1 5/2019

*Primary Examiner* — Abhishek Sarma
(74) *Attorney, Agent, or Firm* — Womble Bond Dickinson (US) LLP

(57) ABSTRACT

The present invention relates to a terminal comprising a main body having an upper surface that is substantially horizontal; a tower extending substantially vertically from said main body, so as to define an acquisition volume delimited by said upper surface and the tower; optical acquisition means arranged within the main body so as to be able to acquire an image of a biometric print placed within the acquisition volume facing the upper surface; a user interface arranged within the tower; wherein the tower has a cavity, and the user interface comprises a screen arranged at the bottom of the cavity and a semi-reflective plate closing the cavity so as to provide the optical illusion that said screen is floating within the acquisition volume. The present invention further relates to a method for acquiring an image of a biometric print by means of the terminal.

14 Claims, 2 Drawing Sheets

(51) Int. Cl.
*G06V 10/141* (2022.01)
*G06V 40/60* (2022.01)
*G01J 5/0806* (2022.01)
*G06K 7/10* (2006.01)
*H04N 23/56* (2023.01)
*G01J 5/00* (2022.01)

(52) U.S. Cl.
CPC ....... *G06K 7/10366* (2013.01); *G06V 10/141* (2022.01); *G06V 40/67* (2022.01); *H04N 23/56* (2023.01); *G01J 2005/0077* (2013.01)

(56) References Cited

U.S. PATENT DOCUMENTS

2015/0227774 A1\* 8/2015 Balch ................. G06V 40/1365
    382/124
2018/0247142 A1\* 8/2018 Oda .................... A61B 5/0077

\* cited by examiner

[Fig. 1]
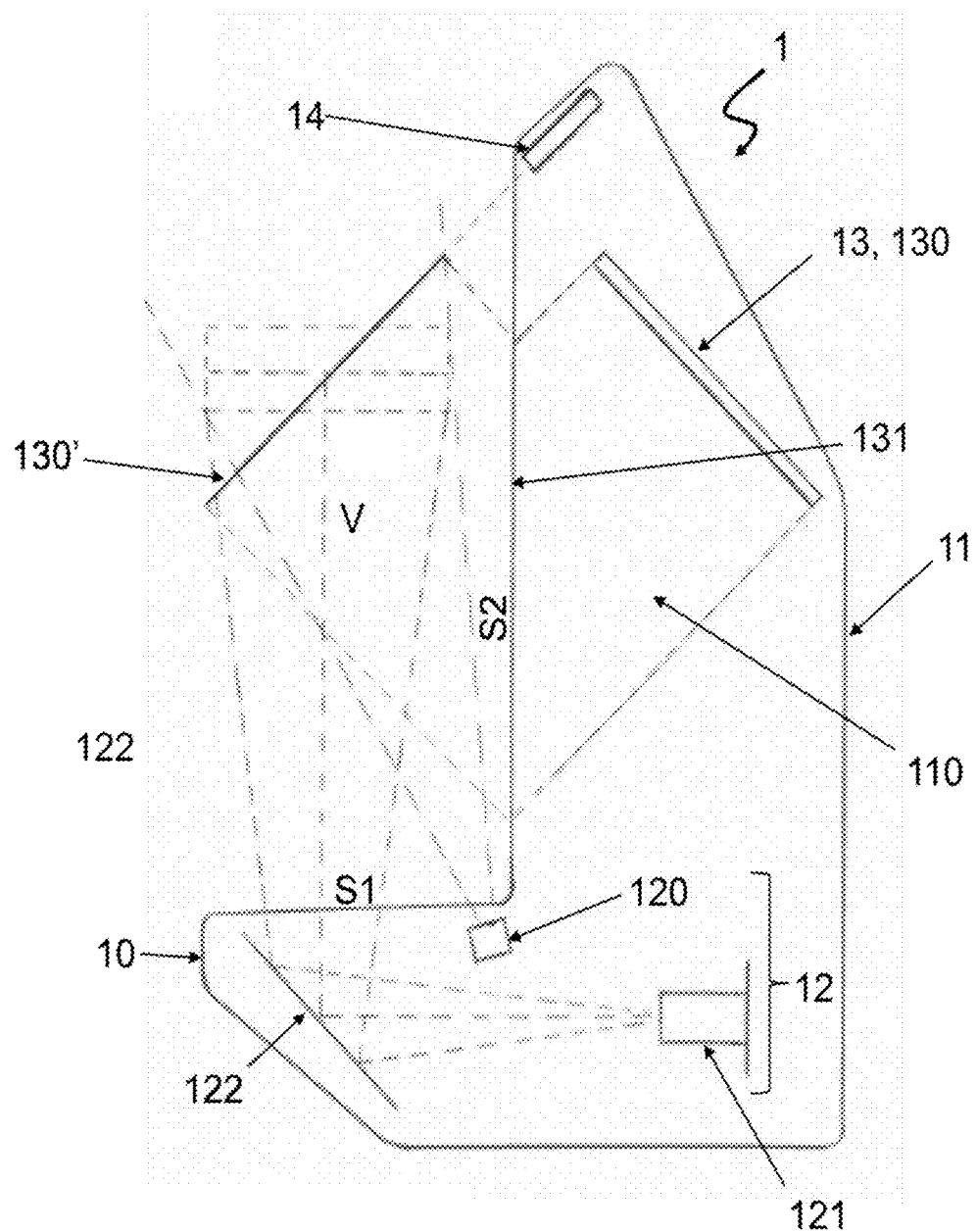

[Fig. 2]
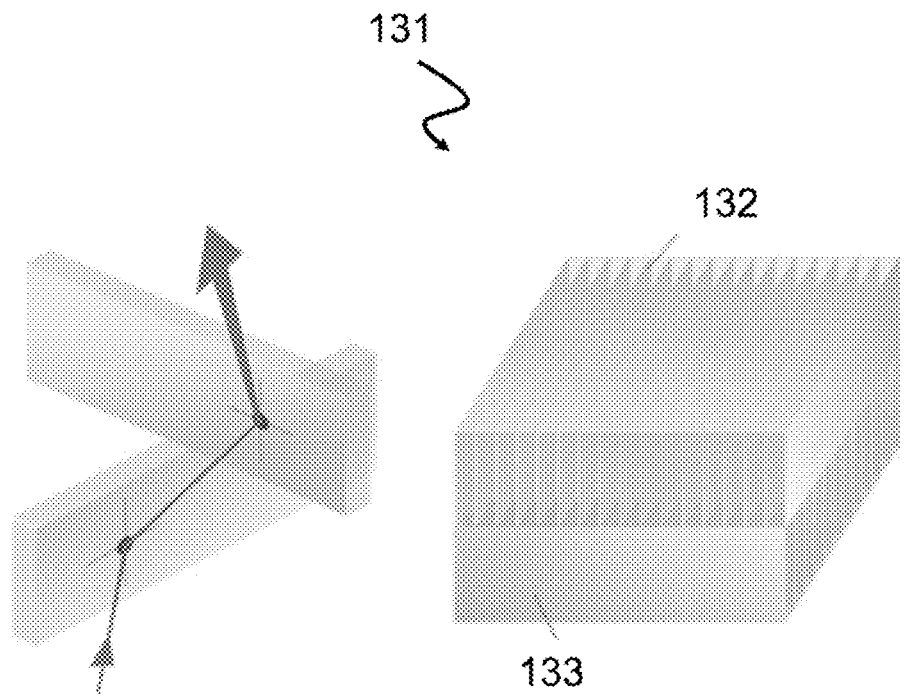
[Fig. 3]
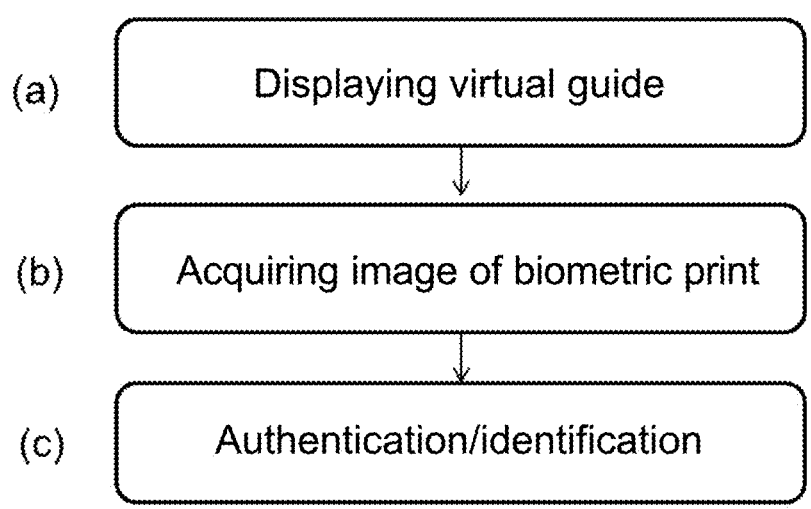

BIOMETRIC TERMINAL, IN PARTICULAR FOR ACCESS CONTROL

CROSS-REFERENCE TO RELATED APPLICATIONS

This application claims priority pursuant to 35 U.S.C. 119(a) to France Patent Application No. 2008089, filed Jul. 30, 2020, which application is incorporated herein by reference in its entirety.

General Technical Field

This invention relates to the field of biometric terminals.

STATE OF THE ART

Access control terminals are known, equipped with an interface (for instance a touchscreen) and one or more biometric print sensors (fingerprint or palm print scanner), which are able to reference and then identify individuals, and trigger actions based on the result of that identification, for instance opening a door if the identified individual has an access right.

For instance, they are found at the entrances of corporate offices, in sensitive infrastructure such as ports and airports, in government buildings, laboratories, military buildings, financial institutions, and in short, on the doors to secure rooms such as server rooms or vaults.

The problem is that it is necessary to touch the interface, in particular to place one's hand on the sensor, which is no longer desirable nowadays, particularly due to pandemic risk.

Terminals in the MorphoWave® product line have consequently been proposed, which can contactlessly acquire a biometric print on the fly. These terminals are C-shaped, with the recessed part of the C defining a notch in which one may swipe one's hand, palm facing down. Biometric acquisition means are arranged in the lower portion of the C, and contactlessly acquire an image of the hand. The upper portion, referred to as "helmet", has a screen and means for near-field communication (NFC), such as with an access badge.

This technology has proven very effective, and has been widely adopted. However, it is sometimes observed that users pass their hand through a bit quickly and strike the helmet, making the action non completely contactless.

The notch could be enlarged or the helmet removed, but then performance would suffer: the user may place their hand improperly, and exposure to ambient light increases.

It would therefore be desirable to have a novel structure of an access control terminal that is at least as effective and ergonomic as known structures, while doing away entirely with the risk of contact.

BRIEF DESCRIPTION OF THE INVENTION

According to a first aspect, the present invention relates to a terminal comprising: a main body having a substantially horizontal upper surface; a tower extending substantially vertically from said main body, so as to define an acquisition volume delimited by said upper surface and the tower; optical acquisition means arranged within the main body so as to be able to acquire an image of a biometric print placed within the acquisition volume facing the upper surface; a user interface arranged within the tower; wherein the tower has a cavity, and the user interface comprises a screen arranged at the bottom of the cavity and a semi-reflective plate closing the cavity so as to provide the optical illusion that said screen is floating within the acquisition volume.

The terminal according to the first aspect may further comprise the following optional features, taken alone or combined with each other, whenever this is technically possible.

Preferably, the tower has a front surface into which said semi-reflective plate is integrated.

Preferably, said acquisition volume is only closed by said upper surface of the main body and front surface of the tower.

Preferably, the screen and the semi-reflective plate lie on intersecting planes, said cavity lying on an axis substantially orthogonal to said plane on which said screen lies, particularly an axis oriented toward the upper surface of the main body.

Preferably, the optical acquisition means enable the acquisition of infrared images, the main body further comprising infrared lighting means for lighting the acquisition volume.

Preferably, the optical acquisition means advantageously comprise an infrared camera arranged inside the main body under the tower, and a mirror arranged under the upper surface of the main body so as to direct the light from the acquisition volume toward the camera.

Preferably, the terminal further comprises means for measuring the position of obstacles within the volume, positioned within the tower above the cavity.

Preferably, the means for measuring the position of obstacles comprise infrared emitters and receivers.

Preferably, the means for measuring the position of obstacles are synchronized with said optical acquisition means so as to not illuminate the acquisition volume during the acquisition of data by said optical acquisition means.

Preferably, the terminal further comprises a contactless reader arranged in the tower so as to be able to communicate with a card placed within the acquisition volume.

Preferably, the screen is configured to display a virtual guide during operation in order to help a user place their biometric print within the acquisition volume.

Preferably, the semi-reflective plate is a plate of at least one layer of micro-mirrors extending parallel to one another in a direction orthogonal to the plane on which the semi-reflective plate lies.

Preferably, the terminal is adapted for access control, and further comprises means for processing an image of a biometric print acquired by the optical acquisition means, said biometric print being at least a fingerprint of a hand.

According to a second aspect, the invention further relates to a method for acquiring an image of a biometric print by means of a terminal according to one of claims 1 to 13, characterized in that it comprises the implementation of the following steps:

(a) Displaying a virtual guide by the screen in order to help a user place their biometric print within the acquisition volume;

(b) Acquiring, by the optical acquisition means, an image of the biometric print placed within the acquisition volume.

DESCRIPTION OF THE FIGURES

Other characteristics and advantages of the present invention will appear upon reading the following description of a preferred embodiment. This description will be given with reference to the attached drawings in which:

FIG. 1 shows in a general manner an embodiment of the terminal according to the invention;

FIG. 2 illustrates an example of a semi-reflecting plate with micro-mirrors;

FIG. 3 shows the steps of a method for using a terminal according to the invention.

DETAILED DESCRIPTION

General Architecture

Referring to [FIG. 1], an access control terminal 1 is proposed. This terminal 1 comprises two major structural elements, a main body 10 and a tower 11. The tower 11 extends substantially vertically away from said main body 10, so as to be generally L-shaped.

More specifically, the main body 10 has a substantially horizontal upper surface S1, on the edge of which the tower 11 rises. Here, and in the remainder of the present description, "substantially" is understood to mean within 30°, preferably within 20°, and even more preferably within 10°.

In FIG. 1, a reference system xOz is depicted, and for the sake of convenience Oz is defined as the vertical axis (oriented from the "bottom" to the "top"), and Ox is defined as the horizontal axis (oriented from the "rear" to the "front"). Thus, the tower 11 is, within this reference system, to the rear of the upper surface S1. This notion of front and rear is understood with reference to a nominal position in which a user arrives from the front of the terminal and moves their hand in the direction of the tower 11 to pass it over the upper surface S1 (see below). Typically, either the main body 10 is placed on a mount (e.g. mounted on a pillar), or the assembly is fastened to a wall at the rear of the main body 10 and tower 11. Access to the front must remain clear.

Preferably, the tower 11 itself has a front surface S2 (vertical), substantially orthogonal to the upper surface S1 of the main body 10. Note that the surface S2 is not necessarily flat.

This structure defines a volume V, referred to as acquisition volume, located in front of the tower 11 and above the main body 10. In other words, the volume V is delimited by the upper surface S1 (which constitutes a lower boundary of the volume V) and the tower 11 (of which the front surface S2 constitutes a rear boundary).

In a known manner, the volume V is not closed at the sides, which makes it possible to sweep one's hand sideways into the volume V (besides the possibility of simply moving the hand toward the tower 11 as explained), i.e. along an axis Oy (not depicted in FIG. 1), orthogonal to the Ox and Oz axes.

In a particularly original manner, the terminal 1 does not comprise a "helmet" such as that of the MorphoWave, i.e. the volume V is not closed at the top, which also makes it possible to move the hand into the volume V from above (by lowering the hand). In other words, said acquisition volume V is only closed by said upper surface S1 of the main body 10 and front surface S2 of the tower 11.

This explains the L-shape rather than a C-shape (the helmet formed the top bar of the C). It should be noted that a structure always enables a user to pass a checkpoint without stopping and is even more intuitive because the number of motions that enable biometric acquisition is greater. This allows for even higher throughput.

The terminal 1 further comprises optical acquisition means 12 arranged within the main body 10 so as to be able to acquire an image of a biometric print placed within the acquisition volume V facing the upper surface S1. "Facing" the upper surface S1 is understood to mean "across from" that upper surface S1, but not in contact. Here, "biometric print" particularly is understood to mean a fingerprint or palm print, i.e. in any case a hand of an individual is placed within the volume V and at least one image of same is acquired by the means 12. It should be noted that in the preferred embodiment of fingerprints, said acquired image may be an image of one or more fingerprints (multiple fingers).

Because the optical acquisition means 12 are arranged in the main body 10, acquisition is from below, i.e. the user must place their palm downward and the back of their hand upward (because the volume V is above the surface S2, which is itself oriented upward). The hand must "float" within the volume V, and we shall see below how the user is prevented from touching the surfaces S1 and S2.

Furthermore, we shall also see below advantageous embodiments of the optical acquisition means 12, but it is understood that any technology known to the person skilled in the art may be adapted. Note that the surface S1 may be provided with an opening or closed by a pane to protect the optical acquisition means 12.

The terminal 1 further comprises a user interface 13 arranged within the tower 11 and, if applicable, data processing means, data storage means, communication means, etc. (which are themselves generally arranged within the main body 10).

In the remainder of the present disclosure, the example of an access control terminal 1 will be taken. Generally speaking, the present invention may apply to any biometric identification or authentication terminal, such as a ticket dispenser, a terminal for purchasing transport tickets, a validator, etc. A person skilled in the art will know how to adapt it.

To that end, the data processing means (not depicted) may be configured to potentially implement the processing of the acquired biometric data (such as segmenting images or correcting them, but also subsequently analyzing them, and even comparing them with reference biometric data), and/or access control, depending on the data that it receives. To that end, it may be connected to a mechanical actuator such as a lock or gate to enable physical access for a user once access is granted to that person. These processing functions may alternatively be wholly or partially offloaded onto a remote server.

Any known biometric identification or authentication technique may be implemented.

"Floating" Screen

As explained, the absence of the helmet may be problematic if the user places their hand incorrectly within the volume V (e.g. too high). Furthermore, the absence of a helmet greatly reduces the risks that the user's hand will touch anything (in fact the helmet was blocking the view), but it is still possible that the user may accidentally touch the surfaces S1 or S2 (in particular by attempting to position their hand more correctly after a failed identification).

The present terminal 1 solves these problems through an original architecture of the user interface 13, which makes it possible to display a virtual guide within the volume V so as to help the user position their hand with no contact being possible. This is because, whereas the helmet was hiding the hand from the user, here it is fully visible and may be visually guided in the space.

To achieve this, the tower 11 has a cavity 110 (a blind cavity opening onto the surface S2), and the user interface comprises a screen 130 arranged at the bottom of the cavity 110 and a semi-reflective plate 131 closing the cavity 110.

This structure, which in principle is very simple, makes it possible to implement a technique which provides the optical illusion that said screen 130 is floating within the acquisition volume V. To put it differently, this phenomenon gives the impression that the screen 130 is in a different place than where it actually is, namely in the volume V.

Thus, the user seeking to touch the screen 130 will spontaneously place their hand correctly within the volume V without touching either of the surfaces S1 or S2. It is also possible to display on the screen 130 a virtual guide to help a user place their biometric print within the acquisition volume V, such as a reference hand outline (or any other visual indicator). It is understood that although the virtual guide is displayed on the physical screen 130, it will be "floating" inside the volume V on the virtual screen 130'. A biometric print that is "correctly placed" within the acquisition volume V is one that is the proper distance away from the surface S1 and substantially centered so that the fingers can be observed, while remaining away from the front surface S2 (to avoid any unhygienic contact).

The explanation of such an optical illusion phenomenon is simple: the human brain does not perceive the deviation of light rays on the semi-reflective plate 131 and assumes that the rays are straight, which is why it imagines that the screen 130 is at the position 130' within the volume V. Again, this is an optical illusion: there is not actually any light emitted into the volume V, the virtual screen 130' is simply a reflection of the actual screen 130.

The semi-reflective plate may be a simple metalized pane (if the cavity 110 is dark enough), but preferably it is a micro-mirror plate 132 as can be seen in [FIG. 2]: such micro-mirrors 132 extend parallel to one another in a direction orthogonal to the plane on which the semi-reflective plate 131 lies (i.e. in the thickness of the plate). As can be seen in FIG. 2, (1) the micro-mirrors 132 are transparent elements that present only their reflective main surface 133 so that the light can enter through their side, and (2) there may be two layers in which the micro-mirrors 132 intersect preferably orthogonally, in order to reflect the light twice (an even number, so that the display is not "mirrored," meaning that it is not flipped, i.e. the screen 130 can display normally). It is understood that the light from the screen 130 passes through the plate 131, but is shifted by an angle equal to twice the angle from the normal of the plate (if the ray has an angle of +α from normal, it exits with an angle of −α).

When the tower 11 has a front surface S2, the semi-reflective plate 131 fits into it (the assembly preferably forming a substantially vertical surface, in particular a substantially flat one).

It is noted that such a structure of a user interface 13 is simple and inexpensive, because it barely costs more than the screen 130 that was already present, whereas genuine "holographic" technology requires complex, expensive equipment that would also be difficult to combine with the optical acquisition means 12.

Preferably, as can be seen in FIG. 1, the screen 130 and the semi-reflective plate 131 lie on intersecting planes, i.e. they are not parallel. Advantageously, directions normal to those planes differ by 30° to 60°, in particular around 45°. In practice, as explained, the semi-reflective plate 131 extends substantially vertically, i.e. the screen 130 is not vertical and preferably oriented downward (i.e. toward the upper surface S1 of the main body 10) so that its reflection 130' is oriented upward (and encourages the user to place their hand at an angle or horizontally).

In mathematical terms, if an axis is defined on which the cavity 110 lies, that axis is substantially orthogonal to said plane on which the screen 130 lies, but is neither orthogonal nor parallel to an axis orthogonal to the plane on which the semi-reflective plate 131 lies (i.e. the Ox axis). That axis on which the cavity 110 lies is, as explained, oriented toward the upper surface S1 of the main body 10.

It should be noted that the virtual guides that may be displayed on the screen 130 (and therefore the virtual screen 130') may be of different types. They may allow for authentication via QR codes read by the optical acquisition means 12, for instance printed on a card that is also to be placed within the acquisition volume V (for instance, "guest" users whose biometrics are not stored in the reference database are given a card that is temporarily active), and in such a case the guide helps a user place a card having a QR code into the acquisition volume V.

Optical Acquisition Means

The user interface structure 13 presented above makes it possible, as explained, to very cleverly do without the helmet.

The only difficulty that may exist lies with the lighting; this is because the helmet made it possible to cast a shadow on the surface S1, and the "open" structure may be difficult to use, for example outdoors (a very bright environment).

This problem is advantageously solved by choosing optical acquisition means 12 that do not operate in visible light but rather in infrared. This way, the lighting is no longer a problem.

In other words, the optical acquisition means 12 are chosen to enable the acquisition of infrared images, i.e. they comprise an infrared camera 121.

As such, as can be seen in FIG. 1, the main body 10 further advantageously comprises infrared lighting means 120 for lighting the acquisition volume V, in particular arranged in the vicinity of the surface S1 so as to not block the light but rather to properly illuminate the hand. More specifically, the hand is illuminated from below by the infrared lighting means 120 and the infrared light reflected onto the surface S1 is captured by the optical acquisition means 12.

To prevent those lighting means 120 from constantly emitting infrared, a proximity or motion sensor may be provided near the volume V (particularly on the surface S1 or near the means 120), and the lighting means 120 may be configured to operate only when that sensor detects the presence of a hand within the volume V.

In a particularly preferred manner, the light emitted by the infrared lighting means 120 is a textured light, so as to enable the acquisition of a depth image of the biometric print. "Depth image" is understood to mean an image containing information relating to the distance along the optical axis between the optical center of the camera and the point observed. In this case (of an infrared image lit with structured light), the image is said to be an "IR 3D" image.

Again, a person skilled in the art will not be limited to a particular acquisition technique, and for instance, there may be multiple cameras 121, some of them in the visible spectrum or purely measuring distance for depth (time of flight, for instance).

In terms of integration, the camera 121 may be arranged inside the main body 10 directly under the surface S1 (potentially protected by a pane), but to reduce the volume of the main body 10 as depicted by FIG. 1, it may be arranged under the tower 11 and a mirror 122 may be provided that is arranged under the upper surface S1 of the main body 10 so as to direct the light from the acquisition volume V towards the camera 121.

Means for Measuring the Position of Obstacles

The screen 130 cannot be touched (because it is under the plate 131 at the bottom of the cavity 110), which is a hygienic advantage but prevents it from being used as a touchscreen.

It would in fact be desirable to be able to use the user interface 13 not only for output but also for input. For instance, the input of a PIN code, in addition to biometric recognition, may be required for strong authentication.

As such, although it is surprising, it is possible to use the virtual screen 130' as an input.

To do so, the terminal 1 further advantageously comprises means for measuring the position of obstacles 14 within the volume V, positioned within the tower 11 above the cavity 110, as can be seen in FIG. 1, and advantageously more specifically within the plane of the virtual screen 130'. "Obstacle" typically refers to the fingers of the hand moved into the volume V when the user wishes to "touch" the virtual screen, but it may, for instance, be a stylus.

Preferably, the means for measuring the position of obstacles 14 extend laterally (in the direction Oy), in particular across the width of the tower 11, so as to be able to detect movements of the user's fingers within the plane of the virtual screen 130'.

In terms of technology, the means for measuring the position of obstacles 14 may comprise a set of infrared emitters and receivers: obstacles such as the fingers "cut off" the infrared beams, and that is what is detected. To enter a PIN code, the user may thus "swipe" on a keyboard displayed by the screen 130 (and therefore the virtual screen 130'). However, the invention will not be limited to any technology in particular for measuring the position of obstacles.

It should be noted that the use of infrared may cause problems in combination with optical acquisition means 12 that are themselves infrared, which is why time-division multiplexing may preferably be implemented: the means for measuring the position of obstacles 14 are synchronized with said optical acquisition means 12 (and more specifically the infrared lighting means 120 and the camera 121) so as to not illuminate the acquisition volume V during the acquisition of data by said optical acquisition means 12. This does not affect the user experience in any way, but guarantees better performance for the biometric acquisition and control functions of the user interface 13.

Other Improvements

Existing biometric terminals commonly comprise a contactless reader (of the NFC "Near Field Communication" type), such as Prox, iClass, MIFARE, and DESFire cards (or even a mobile terminal), either as an alternative to the cards with a QR code mentioned above for managing "guest" users whose biometrics are not stored in the reference database (they are given a temporarily active contactless card), or to implement strong authentication (such as for high-security access control, such as access to a server room), where biometric authentication and the possession of a personal contactless card are required.

For instance, in the MorphoWave terminal, that contactless reader is in the helmet that was removed in the present invention. The present terminal 1 cleverly proposes arranging the contactless reader within the tower 11 so as to be able to communicate with a card placed within the acquisition volume V. For instance, the reader may be arranged on one side of the cavity 110 (particularly the lower side, which makes it possible to have the reader "under" the virtual screen 130').

Thus, everything is done within the volume V regardless of the type of action to be implemented (biometrics, operating the interface 13, and presenting a QR code card or a contactless card) in a very intuitive manner: users, even new users, do not need to look for the readers or understand the interfaces, leading to much higher throughput.

Method for Using the Terminal

According to a second aspect, the invention relates to the method for using the terminal 1 according to the first aspect, i.e. the acquisition of an image of a biometric print by means of the terminal 1.

With reference to [FIG. 3], the method comprises the following steps:

(a) Displaying a virtual guide on the screen 130 (so that this guide appears on the virtual screen 130' that is "floating" within the volume V) to help a user place their biometric print into the acquisition volume V (facing the upper surface S1);

(b) Acquiring, by the optical acquisition means 12, an image of the biometric print (properly) placed within the acquisition volume V;

(c) Advantageously, identifying or authenticating the user based on the image of the biometric print.

It should be noted that steps (a), (b) and/or (c) may be substantially simultaneous: while the guide is being displayed, the optical acquisition means 12 acquire images as the user moves their hand toward the location defined by the virtual guide, until an image has been acquired that is of high enough quality for the authentication/identification to take place.

The invention claimed is:

1. A terminal (1) comprising
   a main body (10) having an upper surface (S1) that is substantially horizontal;
   a tower (11) extending substantially vertically from said main body (10), so as to define an acquisition volume (V) delimited by said upper surface (S1) and the tower (11);
   optical acquisition means (12) arranged within the main body (10) so as to be able to acquire an image of a biometric print placed within the acquisition volume (V) facing the upper surface (S1);
   a user interface (13) arranged within the tower (11);
   wherein the tower (11) has a cavity (110), and the user interface (13) comprises a screen (130) arranged at the bottom of the cavity (110) and a semi-reflective plate (131) closing the cavity (110) so as to provide the optical illusion that said screen (130) is floating within the acquisition volume (V).

2. The terminal according to claim 1, wherein the tower (11) has a front surface (S2) into which said semi-reflective plate (130) is integrated.

3. The terminal according to claim 2, wherein said acquisition volume (V) is only closed by said upper surface (S1) of the main body (10) and front surface (S2) of the tower (11).

4. The terminal according to claim 1, wherein the screen (130) and the semi-reflective plate (131) lie on intersecting planes, said cavity (110) lying on an axis substantially orthogonal to said plane on which the screen (130) lies, particularly an axis oriented toward the upper surface (S1) of the main body (10).

5. The terminal according to claim 1, wherein the optical acquisition means (12) enable the acquisition of infrared images, the main body (10) further comprising infrared lighting means (120) for lighting the acquisition volume (V).

6. The terminal according to claim 5, wherein the optical acquisition means (12) advantageously comprise an infrared camera (121) arranged inside the main body (10) under the tower (11) and a mirror (122) arranged under the upper surface (S1) of the main body (10) so as to direct the light from the acquisition volume (V) toward the camera (121).

7. The terminal according to claim 1, wherein the terminal (1) further comprises means for measuring the position of obstacles (14) within the acquisition volume (V), positioned within the tower (11) above the cavity (110).

8. The terminal according to claim 7, wherein the means for measuring the position of obstacles (14) comprise infrared emitters and receivers.

9. The terminal according to claim 8, wherein the means for measuring the position of obstacles are synchronized with said optical acquisition means so as to not illuminate the acquisition volume during the acquisition of data by said optical acquisition means.

10. The terminal according to claim 1, further comprising a contactless reader arranged in the tower (11) so as to be able to communicate with a card placed within the acquisition volume (V).

11. The terminal according to claim 1, wherein the screen (130) is configured to display a virtual guide during operation in order to help the user place their biometric print within the acquisition volume (V).

12. The terminal according to claim 1, wherein the semi-reflective plate (131) is a plate of at least one layer of micro-mirrors (132) extending parallel to one another in a direction orthogonal to the plane on which the semi-reflective plate (131) lies.

13. The terminal according to claim 1, adapted for access control, further comprising means for processing an image of a biometric print acquired by the optical acquisition means (12), said biometric print being at least a fingerprint of a hand.

14. A method for acquiring an image of a biometric print by means of a terminal (1) according to claim 1, wherein it comprises the implementation of the following steps:
   (a) Displaying by the screen (130) a virtual guide in order to help the user place their biometric print within the acquisition volume (V);
   (b) Acquiring, by the optical acquisition means (12), an image of the biometric print placed within the acquisition volume (V).

* * * * *